Dec. 23, 1952   J. R. ORDING   2,622,691
SEISMIC EXPLORATION METHOD
Filed May 14, 1948   2 SHEETS—SHEET 1

James R. Ording, INVENTOR.
BY Dwight C. Otis
AGENT.

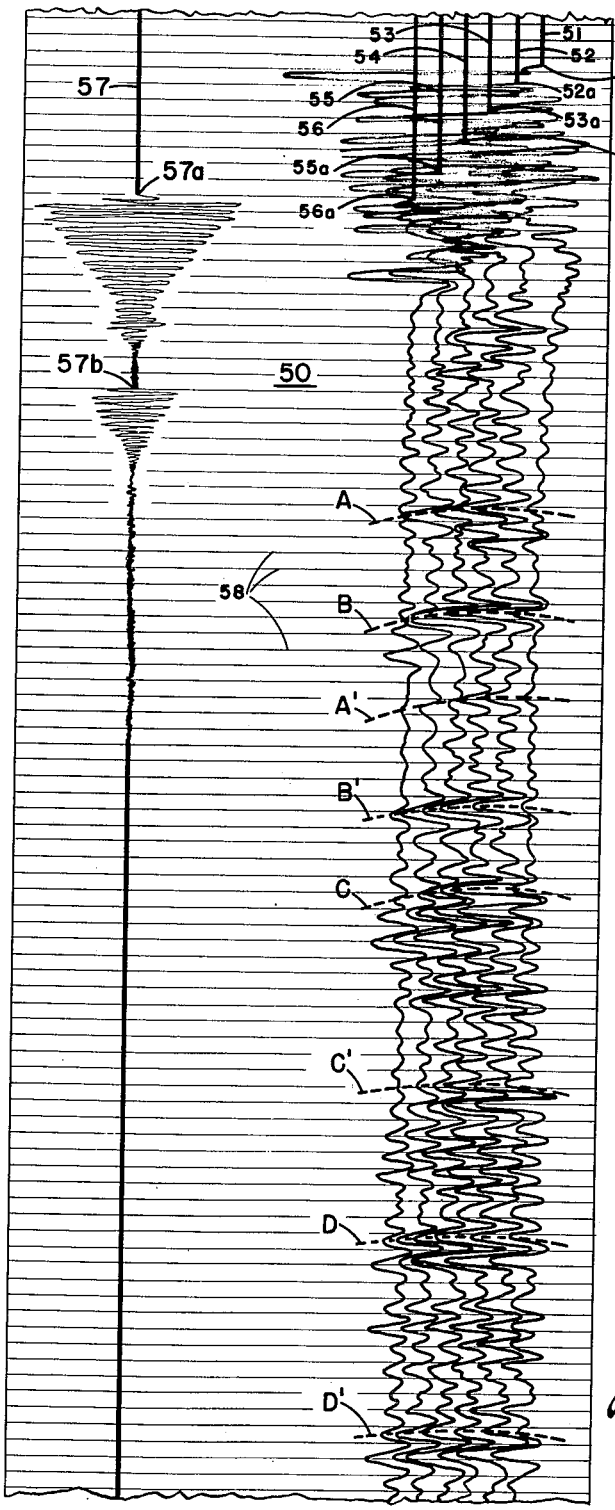
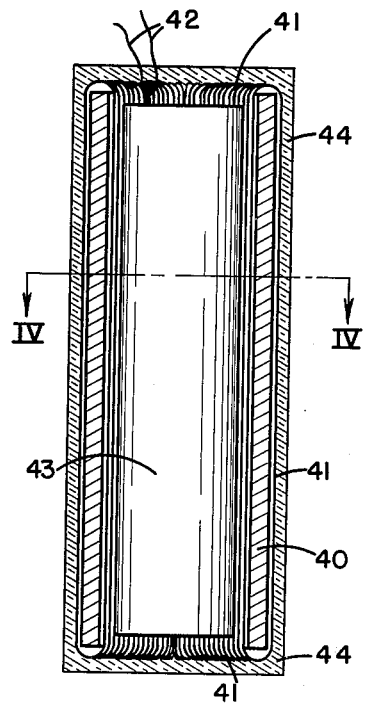
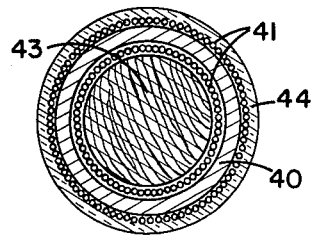

Patented Dec. 23, 1952

2,622,691

UNITED STATES PATENT OFFICE 2,622,691

SEISMIC EXPLORATION METHOD

James R. Ording, Houston, Tex., assignor, by mesne assignments, to Standard Oil Development Company, Elizabeth, N. J., a corporation of Delaware Application May 14, 1948, Serial No. 27,115

3 Claims. (Cl. 181—.5)

The present invention is directed to improvements in a method and apparatus for seismic exploration over areas submerged under water.

In the present specification, and in the appended claims, reference will frequently be made to wave energy propagated predominantly in one medium or another. So that a clear distinction may be made between the several terms employed to designate this wave energy and the medium through which it is predominantly propagated, it is to be understood, hereinafter, that the term "elastic waves" will be used in a generic sense without regard to the specific medium through which the waves are propagated. The terms "seismic waves" and "reflection seismograph waves" will be used in their usual sense to designate elastic wave energy propagated along wave paths lying predominantly in lithologic earth formations. The term "compressional waves" will be used in a limited sense to designate elastic wave energy propagated along wave paths lying predominantly in water or other similar liquid medium.

It is known to make seismic measurements over both water-covered and non-water-covered areas of the earth's surface whereby depths of various earth strata may be calculated. In obtaining these seismic measurements it is conventional practice to fire a suitable charge of dynamite or similar explosive at a selected shot point station on or below the surface of the earth in order to generate seismic waves, and then to measure the time of arrival of certain rays of these waves at geophones or seismometers arranged at a plurality of stations spaced from the shot point upon the surface of the earth. The seismic waves received by the geophones are converted therein to electrical waves which may be amplified and recorded by known oscillographic means upon a moving record strip. For proper interpretation, records thus produced must be free from spurious secondary responses and disturbances.

Depending upon the nature and depth of the earth formations to be measured, either reflected or refracted seismic waves may be utilized. In reflection seismograph work the geophones or seismometers are usually spaced from several hundred to a thousand feet or slightly more from the shot point, whereas in refraction seismograph work the geophones are generally spaced several thousand feet or even a few miles from the shot point. Since it is known that the explosion of a charge of dynamite in the earth generates seismic waves having frequencies ranging from a few cycles to many thousand cycles per second and since it is also known that high frequency seismic waves are attenuated rapidly as they pass through the earth formations while low frequency waves are not as rapidly attenuated, it will be apparent that somewhat higher frequency waves may be useful in reflection seismograph work than are useful in refraction seismograph work. Thus, seismic waves having frequencies ranging up to about 100 or 150 cycles per second, but usually those having frequencies below about 100 cycles per second, are useful in reflection seismograph work, whereas waves having frequencies up to about 15 cycles per second are most useful in refraction seismology.

When conducting explorations under water-covered areas such as lakes, rivers, ocean bays and the like, it has been found that secondary seismic disturbances are frequently generated when a charge of explosive is fired beneath the surface of the water. These secondary seismic disturbances are believed to be created by the oscillation and eventual collapse of the gas bubble or cavity formed in the water by the exploding charge. Various workers in the art have proposed methods whereby the production of these secondary disturbances may be minimized or eliminated. However, in practical seismic exploration work over water-covered areas circumstances may exist whereby an operator cannot be certain that he has always eliminated the production of secondary seismic disturbances and the recording of the resulting spurious responses. Accordingly, when computations are made from the seismogram records, frequently by a worker other than the one who actually fired the explosive charge or manipulated the recording apparatus, the computor may not know with any degree of certainty that spurious responses do not appear upon a given record.

The present invention takes advantage of the facts that compressional waves, including waves of higher frequencies than the useful reflection seismograph waves are generated in the water simultaneously with the objectionable secondary seismic disturbances, and these high frequency compressional waves may be propagated for many miles through a body of water with much less attenuation than occurs when seismic waves of these frequencies are propagated through earth formations.

It is one object of the present invention to provide means for indicating definitely the presence or absence of secondary seismic disturbances over water-covered areas.

It is another object of the present invention to provide means and a method for indicating upon, or in conjunction with, a seismogram an indication of the presence or absence of any spurious secondary seismic disturbance which may have accompanied the production of a desired primary seismic disturbance.

Still other and further objects of the present invention will become apparent from the following description taken in conjunction with the accompanying drawings, in which Fig. 1 is a sectional view of a submerged area of the earth illustrating one embodiment of the method of practicing the present invention;

Fig. 3 is an elevation view, partly in section, of one embodiment of a non-directional, compressional wave detector which has been found particularly useful in the practice of the present invention;

Fig. 4 is a sectional view taken along the line IV—IV of Fig. 3;

Fig. 5 is an idealized reproduction of a part of one seismogram record further illustrating the advantages and the method of the present invention.

Figure 1:
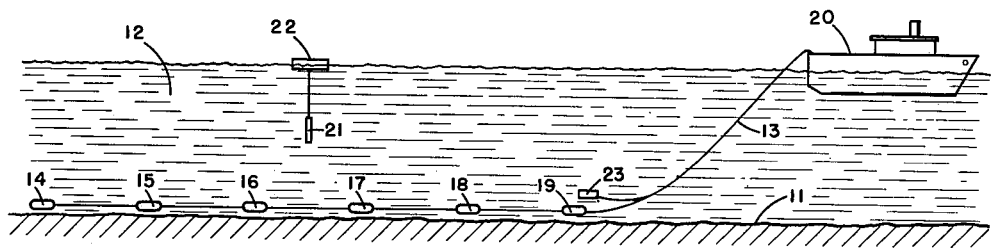

Referring first to Fig. 1 numeral 11 designates the surface of earth formations submerged below a body of water 12. In conducting seismic exploration beneath the surface of the water 12 it has been found desirable to provide a multiconductor insulated cable 13 of a predetermined length and to connect to suitable pairs of conductors within the cable a plurality of geophones or seismometers 14, 15, 16, 17, 18 and 19. The seismometers may be spaced along the cable in any desired fashion but preferably are arranged with uniform spaces therebetween ranging from a few hundred to several thousand feet. A free end of the cable 13 may be fastened aboard a boat 20 or other suitable craft whereby the cable and seismometers may be towed through the water to desired locations. The seismometers 14-19, inclusive, are preferably of a type which will convert seismic wave energy to electrical waves and suitable electrical amplifying and recording equipment for these waves may be mounted upon the boat 20 and may be connected to the seismometers through the conductors of cable 13.

Similar to seismic exploration on non-water-covered areas, it is desirable to select stations over the water-covered area to be prospected at which stations charges of dynamite, or other similar explosive, may be placed and fired after the geophones have been placed in desired position relative thereto. In Fig. 1 the numeral 21 designates a charge of explosive which it is assumed has been arranged at one of the selected shot point stations. After the charge has been fired and the desired seismic records made, the boat 20 then proceeds along a predetermined course towing cable 13 until the seismometers 14-19 lie along a line bearing a predetermined relation to the location of the next explosive charge. The boat 20 is then anchored so that the seismometers come to rest in the desired locations, the charge of explosive is fired by remote control means which are well known, and the seismic waves which are generated by the explosion are picked up by seismometers 14 to 19 and recorded in conventional manner.

Although in Fig. 1 explosive charge 21 has been illustrated as being suspended from a float 22, it will be understood that explosive charge 21 may be placed directly on the surface of the earth formation 11 or it may be placed in a borehole penetrating the surface 11.

It has been observed that, when a charge of explosive is fired beneath the surface of the water, the gaseous combustion products of the explosive charge, when fired, form a gas bubble which tends to expand and contract in an oscillating fashion before it ultimately breaks through the surface of the water. During this expansion and contraction, high intensity secondary shock waves are produced which are similar to the desired primary shock waves generated by explosion of the charge. These secondary shock waves travel through the earth in a manner similar to, but at a time later than the primary shock waves and may be reflected from subsurface earth formations and then be picked up by the geophones. Since the time interval between the generation of primary shock waves and the formation of the secondary shock waves appears to be a function of the size of the explosive charge and the depth of placement thereof, it will be apparent that this timing may vary widely from one shot point station to another and that, at some stations, conditions may be such that no secondary shock waves are formed.

In accordance with my invention, in order to provide a record of the presence or absence of these secondary shock waves, I provide a special detector 23 which is preferably responsive to water propagated compressional waves of somewhat higher frequency than earth propagated seismic waves. Detector 23 may be placed beneath the surface of the water at any point along cable 13. However, it is preferably placed immediately adjacent one or another of the seismometers 14—19. Still more preferably the detector 23 is placed adjacent a seismometer which is the most remote from the location at which the charge of explosive is fired.

Although in Fig. 1 six seismometers 14, 15, 16, 17, 18 and 19, and one high frequency wave or secondary shock detector 23 have been shown connected at spaced points along cable 13, it will be apparent to a skilled worker that a larger or smaller number of seismometers and high frequency wave detectors may be employed if desired. In a typical arrangement for seismograph reflection work, twelve seismometers uniformly spaced at distances of 200 feet therebetween has been found satisfactory. When employing an arrangement of this sort it is desirable to tow the cable along a course parallel to a straight line connecting successive shot point stations, and to make seismic measurements when the cable is at a position such that the shot point station is approximately half way between the sixth and seventh seismometer. If shot point stations are then spaced a thousand feet apart six seismometers will provide measurements in one direction along the course from the shot point while the other six seismometers provide records in the opposite direction along the course from the shot point. It is to be understood, however, that the practice of my invention is not limited to any specific spacing or arrangement of seismometers with respect to the shot point station nor to any specific method of placing them. Thus, instead of arranging the seismometers in a single straight line, they may be fanned out radially from the shot point if desired. Furthermore, the seismometers may be towed through the water while constantly in contact with the bottom thereof or they may be floated or otherwise transported while in motion and then be brought to rest or planted in the earth stratum forming the bottom of the body of water.

Figure 2:
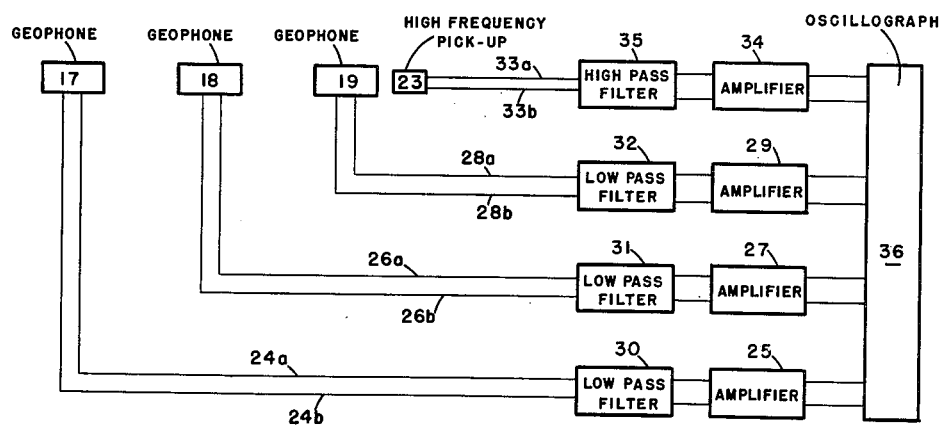
Fig. 2 is a block diagram illustrating schematically the electrical connections of apparatus which may be employed in the practice of the present invention.

Turning now to Fig. 2, the electrical connections of a part of the geophones or seismometers and the high frequency wave detector referred to in Fig. 1 are illustrated by block diagrams. In Fig. 2 the rectangles 17, 18 and 19 represent the seismometers 17, 18 and 19 in Fig. 1 while the rectangle 23 represents the high frequency wave detector 23 of Fig. 1. The geophones 17, 18 and 19 may be conventional geophones which are responsive to low frequency seismic waves having a frequency in the range from about one to 100 cycles per second. The geophones 17, 18 and 19 may also be constructed to respond to seismic waves which arrive predominantly in any desired plane with respect to the normal position of the geophones. However, as will be explained more fully in connection with the description of Figs. 3 and 4 the high frequency wave detector 23 is preferably non-directional, that is, it is responsive to water propagated compressional waves arriving from any and all directions. Although detector 23 may be responsive to compressional waves having a wide range of frequencies, including frequencies below 100 cycles, it is preferably responsive to compressional waves having frequencies in the range from about 200 to a thousand or more cycles per second.

As will be seen from Fig. 2, the geophone 17 is connected by means of electrical conductors 24a and 24b to an amplifier 25. Similarly, geophone 18 is connected by conductors 26a and 26b to a separate amplifier 27. Likewise geophone 19 is connected by conductors 28a and 28b to an amplifier 29. Amplifiers 25, 27 and 29 are conventional to the seismic prospecting art and will not be described in great detail herein. As is well known in the art, these amplifiers are preferably constructed so as to respond to low frequency electrival waves in the frequency range up to about 100 cycles per second. If desired they may be constructed so as to cut off or highly attenuate electrical waves having frequencies greater than about 100 cycles. Alternatively, amplifiers 25, 27 and 29 may be constructed to have a "flat" response to electrical waves having frequencies from about one to more than a thousand cycles per second and each amplifier may be provided with a low pass filter of well known construction, designated by the rectangles 30, 31 and 32, designed to pass electrical waves having frequencies less than about 100 cycles per second and to attenuate substantially completely waves having frequencies greater than about 100 cycles per second.

The detector 23 is connected by conductors 33a and 33b to a separate amplifier 34 which may be a conventional amplifier constructed to be responsive to electrical waves having frequencies greater than about 200 cycles per second and to attenuate sharply electrical waves having frequencies less than about 200 cycles per second. If desired, amplifier 34 may be constructed to have a flat response in the range from a few cycles to more than a thousand cycles per second and a high pass filter 35 may be interposed between the detector 23 and the amplifier 34. Under these circumstances the filter 35 will be arranged to pass electrical waves having frequencies in the range from about 200 cycles to a thousand or more cycles per second and to attenuate substantially completely those waves having frequencies less than about 200 cycles per second.

In a preferred embodiment of my invention the output signals from amplifiers 25, 27, 29 and 34 are fed into conventional recording oscillograph 36 preferably adapted to record upon a moving film or strip trace lines which represent functions of the seismic wave energy received by geophones 17–19 and detector 23. The record strip produced by oscillograph 36 will preferably be provided with suitable indications of time intervals in a manner conventional to the seismograph art.

As has been mentioned hereinbefore, detector 23 is preferably non-directional. Nevertheless, detector 23 may be directional, that is, may be responsive to waves which arrive from a single direction provided detector 23 is always oriented so as to be predominantly responsive to waves arriving over a straight line path passing through the shot point and said detector. A particularly satisfactory detector which is non-directional, which contains no moving parts to get out of order, and which may be readily constructed to be resonant at frequencies higher than 200 cycles per second is shown in the accompanying Figs. 3 and 4. The structure of this detector, together with certain modifications thereof, is also disclosed in my copending application, Serial No. 17,178, filed March 26, 1948, and in my copending application Serial No. 249,185, filed October 1, 1951, which is a continuation-in-part of said application Serial No. 17,178.

Referring to Figs. 3 and 4, the numeral 40 designates an elongated tubular element made of a metal or alloy capable of exhibiting strong magnetostrictive properties. While element 40 is illustrated as circular in transverse cross section, it may, if desired, be rectilinear, polygonal or elliptic in cross section. Since the element 40 must be magnetically polarized, it is preferably constructed from a material capable not only of exhibiting magnetostrictive properties, but also of being permanently magnetized. One alloy which is illustrative of a suitable material is known as 2 V Permendur and comprises substantially 2% vanadium, 48% iron and 50% cobalt. After heating to 1,000° F. for 20 minutes, this alloy hardens, becomes permanently magnetizable, and will exhibit magnetostrictive properties to a high degree.

If desired, the element 40 may be constructed from a nickel or cobalt tube from which a narrow longitudinal strip has been removed and replaced by a permanently magnetizable metal or alloy, such as steel.

Over element 40 is wound an electrically conducting coil 41 comprising a plurality of turns of insulated wire terminating in the leads 42. The turns of coil 41 are preferably wound in the form of a ring or torus wholly encasing element 40. Although in the drawing a single layer coil is shown, it is to be understood that a multi-layer coil may be employed. The principal length of each turn of the conductor in coil 41 thus lies substantially parallel with the longitudinal axis of element 40 and is electromagnetically coupled to said element.

Disposed within element 40 is a loosely fitting relief plug 43 of rigid or semi-rigid resilient material such as soft wood. Plug 43 serves primarily as a cushion against which the walls of element 40 may be slightly distorted by stresses applied to the outside surfaces thereof. Plug 43 also holds the turns of coil 41 in close proximity to the inner walls of element 40 at all times.

To exclude moisture and foreign materials, the assembly of parts described above may be impregnated with a thermoplastic insulating resin 44. The insulating medium 44 is preferably a solid which, during application, is at least semi-liquid and will penetrate between turns of coil 41 and make firm contact with the outer surface of element 40. In its finished form medium 44 must be free from air bubbles so that minute stresses applied to the exterior thereof will be transmitted uniformly against surfaces of element 40. Since the detector described herein is completely immersed in water, when in use, it is important that means be provided to prevent entry of the water against the inner surfaces of element 40. Accordingly, insulating medium 44 is applied in a manner to exclude water from entering between relief plug 43 and the inner walls of element 40. Insulating medium 44 may be selected from a wide variety of thermoplastic resins such as polystyrene, acrylate, methacrylate, methyl-methacrylate and the like resins.

If desired, a non-magnetic case (not shown) having perforated walls for free access of liquid therein may be arranged externally of insulating medium 44 to provide mechanical protection of the assembled detector. The leads 42 may be anchored in suitable manner and brought out through the metal case for connection to the cable 13 of Fig. 1.

As has already been mentioned, the element 40 must be magnetically polarized. This may be conveniently be accomplished by passing through coil 41 a uni-directional current such as that obtainable from a 50 microfarad condenser charged at 2,000 volts.

The sensitivity of the above described detector may be varied to some extent by varying its length or diameter or both. Its resonant frequency response also may be varied to an appreciable extent by varying the wall thickness of the element 40. One particular detector which was found satisfactory for indicating the presence of spurious secondary seismic disturbances was constructed as described above. The element 40 was a Permendur tube having a length of 4½ inches, a diameter of 2¼ inches and a wall thickness of 0.035 inch. The plug 43 was approximately 4 inches long and 1 inch in diameter, while the outer insulating case 44 was approximately 5 inches long and 2¾ inches in diameter. The whole assembly was encased in a free-flooding, non-magnetic metal case to protect it from mechanical abrasion.

The method and certain advantages of my invention may be better understood by reference to Fig. 5 which is an illustrative reproduction of parts of a seismogram made in accordance with the method described hereinbefore. The numerals 51, 52, 53, 54, 55 and 56 designate traces made upon a moving record strip 50 by conventional oscillographs which were connected through suitable amplifiers and conductors to six seismometers. The amplifiers were conventional to the seismic exploration art and were provided with low pass filters which sharply attenuated signals having frequencies greater than 100 cycles per second. The seismometers also were of well known design and were spaced 200 feet apart upon the ocean floor in the Gulf of Mexico so as to pick up relatively low frequency seismic waves transmitted thereto through earth formations beneath the ocean.

Numeral 57 similarly designates a trace made upon the record strip by another oscillograph which was connected through an amplifier and suitable conductors to a high frequency compressional wave detector constructed in accordance with Figs. 3 and 4. The amplifier was arranged to attenuate sharply signals having frequencies below about 200 cycles per second. The high frequency detector was placed immediately adjacent the seismometer which produced trace 56 and was approximately 1000 feet from the shot point station at which a six pound charge of high explosive was fired beneath the surface of the water. The shot point station was adjacent the seismometer which produced trace 51.

Parallel lines such as the lines 58 in Fig. 5 mark off uniform periods of time.

As will be apparent to a worker skilled in the seismic prospecting art, the first shock resulting from explosion of the high explosive arrived at the nearest seismometer at the instant designated 51a and similarly arrived at successive seismometers spaced therefrom at the instants designated 52a, 53a, 54a, 55a, and 56a. It will also be apparent that the first shock of the explosion arrived at the high frequency detector and was recorded in trace 57 at the instant designated 57a. About 0.24 second later, at the instant designated 57b, a secondary shock was also recorded on trace 57 and, after this disturbance decayed, no further shocks were recorded upon this trace.

As will be further apparent to a worker skilled in the art the pronounced series of undulations, of similar character in each of the traces 51–56 inclusive, appearing at the points connected by broken lines A, B, A', B', C, C', D and D' indicate responses of the seismometers due to reflections from subsurface earth strata. Ordinarily, these responses might be interpreted as reflections from successively deeper strata. However, upon careful examination it may be observed that the character of the responses designated A and A' are strikingly similar to each other and are timed with respect to each other by a period substantially identical to the period between the instants 57a and 57b. Similar phenomena may be observed with respect to the responses B—B', C—C' and D—D'. Although the pairs of responses A—A' to D—D' may be indicative of true and significant reflections from successively deeper horizons, the presence of successive shock records 57a and 57b upon the seismogram warns the computor that responses A', B', C', and D' may be spurious and probably are reflections of the secondary or "bubble pulse" shock 57b from the horizons which reflected the primary shock 57a to produce true responses A, B, C and D.

From a knowledge of the shot instant customarily recorded upon a seismogram (but not shown in Fig. 5) and from a knowledge of the velocity of sound waves in water, the computor may calculate the precise distance from the shot point to the detector which produced the trace 57. This calculation obviously may be useful in checking the distances of each of the seismometers from the shot point.

The presence of the trace 57 upon the seismogram is useful not only to the computer but may also be useful to the seismic operator obtaining the field data. When a secondary response 57b is observed upon the seismogram, the operator may be immediately notified that any efforts he may have made to prevent generation of secondary shocks were unsuccessful. He may, if the record is examined while still at the particular station, immediately make further efforts to obtain a record free from secondary disturbances, thereby improving the accuracy of his field data.

The shock records provided by the trace 57 are, therefore, indicia which are readily interpretable in terms of presence or absence of secondary seismic impulses upon the record. The presence of two or more groups of wave trains similar to 57a and 57b in Figure 5 are indicative of the presence of one or more secondary seismic impulses, while the presence of a single wave train, such as 57a, is indicative of the presence of the desired primary impulse and the absence of undesired secondary impulses.

Although in the foregoing description I have shown the simultaneous recording of a high frequency trace 57 upon the same record with a plurality of relatively low frequency traces 51–56, it will be apparent that it is within the scope of my invention to display this trace upon a separate record bearing time indications which may be readily correlated with time indications for the low frequency signals or traces.

Having thus fully described and illustrated the method of my invention, what I desire to claim as new and useful and to secure by Letters Patent is:

1. In the art of seismic exploration of an area covered by a body of water, the method of producing a seismic record carrying indicia readily interpretable in terms of presence and absence of secondary seismic impulses generated incidental to detonation of explosive material beneath the body of water comprising, in combination, the steps of detonating an explosive material at a first station in said body of water, receiving seismic waves resulting from said detonation at a detector station spaced from said first station, receiving water-propagated compressional waves resulting from said detonation at a point in said body of water spaced from said first station, removing from the received compressional waves components having frequencies within the frequency range of useful reflection seismograph waves, and separately and simultaneously recording upon a moving strip a function characteristic of the received seismic waves and a function characteristic of components of the received compressional waves having frequencies higher than useful reflection seismograph waves.

2. In the art of seismic exploration of an area covered by a body of water, the method of producing a seismic record carrying an identifying index concerning the presence or absence of secondary seismic impulses generated incidental to detonation of an explosive material beneath a body of water comprising, in combination, the steps of detonating a charge of explosive at a first station in said body of water, receiving seismic waves resulting from said detonation at a detector station spaced from said first station, receiving water-propagated compressional waves resulting from said detonation at a point in said body of water spaced from said first station, removing from the received compressional waves components having frequencies below about 200 cycles per second, and separately and simultaneously recording upon a moving strip a function characteristic of the received seismic waves and a function characteristic of the received compressional waves having frequencies above about 200 cycles per second.

3. In the art of seismic exploration of an area covered by a body of water, the method of producing a seismic record carrying indicia readily interpretable in terms of presence or absence of secondary seismic impulses generated incidental to detonation of an explosive material beneath the body of water comprising, in combination, the steps of detonating a charge of explosive at a first station beneath said body of water, receiving seismic waves resulting from said detonation at a plurality of detector stations spaced from said first station beneath the body of water, receiving water-propagated compressional waves adjacent at least one of said detector stations, attenuating substantially completely from the received compressional waves components having frequencies below about 200 cycles per second, and separately and simultaneously recording upon a moving strip a function characteristic of the received seismic waves and a function characteristic of components of the received compressional waves having frequencies above about 200 cycles per second.

JAMES R. ORDING.

REFERENCES CITED

The following references are of record in the file of this patent:

UNITED STATES PATENTS

| Number | Name | Date |
|---|---|---|
| 2,279,191 | Adler | Apr. 7, 1942 |
| 2,324,378 | Flude | July 13, 1943 |
| 2,364,209 | Green | Dec. 5, 1944 |
| 2,465,696 | Paslay | Mar. 29, 1949 |